US008811413B2

(12) United States Patent
Bialkowski (10) Patent No.: US 8,811,413 B2
(45) Date of Patent: Aug. 19, 2014

(54) SCALABLE MULTI-HOP MESH PACKET SWITCH FABRIC

(75) Inventor: Jan Bialkowski, San Jose, CA (US)

(73) Assignee: Infinera Corporation, Sunnyvale, CA (US)

( * ) Notice: Subject to any disclaimer, the term of this patent is extended or adjusted under 35 U.S.C. 154(b) by 281 days.

(21) Appl. No.: 12/476,096

(22) Filed: Jun. 1, 2009

(65) Prior Publication Data
US 2010/0303086 A1    Dec. 2, 2010

(51) Int. Cl.
*H04L 12/28* (2006.01)
(52) U.S. Cl.
USPC ...... 370/401; 370/395.42; 370/400; 370/412; 709/244; 709/249
(58) Field of Classification Search
USPC ............. 370/235, 395.4, 342, 231–232, 370/387–389, 395.2, 395.41, 400–401, 406, 370/412; 709/394, 205, 244, 249; 710/306, 710/309–313, 316–317
See application file for complete search history.

(56) References Cited

U.S. PATENT DOCUMENTS

| | | | |
|---|---|---|---|
| 6,272,109 B1 * | 8/2001 | Pei et al. ................ | 370/230 |
| 6,819,686 B1 * | 11/2004 | Frannhagen et al. ..... | 370/535 |
| 7,006,438 B2 * | 2/2006 | West et al. ............. | 370/231 |
| 7,054,310 B1 * | 5/2006 | Shivji et al. ........... | 370/366 |
| 7,165,120 B1 * | 1/2007 | Giles et al. ............ | 709/249 |
| 7,518,883 B1 * | 4/2009 | Suitor et al. ........... | 361/788 |
| 7,539,175 B2 * | 5/2009 | White et al. ........... | 370/350 |
| 2003/0086644 A1 * | 5/2003 | Bhalla et al. ........... | 385/24 |
| 2004/0032872 A1 * | 2/2004 | Dhara ................. | 370/401 |
| 2006/0209681 A1 * | 9/2006 | Yamamoto ............. | 370/218 |
| 2007/0060178 A1 * | 3/2007 | Gorokhov et al. ........ | 455/506 |
| 2007/0233927 A1 * | 10/2007 | Fallah-Adl et al. ....... | 710/301 |
| 2008/0123531 A1 * | 5/2008 | Gerkis ................ | 370/235 |
| 2008/0151863 A1 * | 6/2008 | Lawrence et al. ......... | 370/351 |
| 2010/0202460 A1 * | 8/2010 | Park et al. ............. | 370/394 |

* cited by examiner

*Primary Examiner* — Charles C Jiang
*Assistant Examiner* — Mohamed Kamara
(74) *Attorney, Agent, or Firm* — David L. Soltz

(57) ABSTRACT

The present invention provides a multi-hop mesh fabric that allows existing systems to be more effectively scaled to increase bandwidth and the number of nodes within the fabric. The multi-hop mesh fabric also provides redundancy for each of the connections between nodes. The multi-hop mesh fabric may be realized in various different architectures including the maximum number of hops within the fabric and the layout of the fabric (e.g., full mesh vs. sparse mesh). The multi-hop mesh fabric may further improve its efficiency by employing various load balancing techniques, different scheduling methods, and other traffic management technologies known by one of skill in the art. Furthermore, the multi-hop mesh fabric may be realized in different environments including intra-devices, inter-device intra-blade, intra-blade intra-system, and inter-system intra-cluster.

27 Claims, 8 Drawing Sheets

SCALABLE MULTI-HOP MESH PACKET SWITCH FABRIC

BACKGROUND

A. Technical Field

The present invention relates generally to network switching fabric architectures, and more particularly, to a scalable multi-hop mesh switching fabric.

B. Background of the Invention

As used throughout this description and the drawings, the following terms have the following meanings unless otherwise stated:

Single-Hop—Traffic which crosses a single link or path from a source node to a destination node.

Two-Hop—Traffic which crosses two links or paths from a source node to a destination node, passing through one intermediate node.

N-Hop—Traffic which crosses any number of N links or paths from a source node to a destination node, passing through N−1 intermediate nodes.

Two-Hop Mesh Fabric—A mesh fabric that allows both, single-hop and two-hop paths from a source node to a destination node.

Three-Hop Mesh Fabric—A mesh fabric that allows single-hop, two-hop, and three-hop paths from a source node to a destination node.

K-Hop Mesh Fabric—A mesh fabric that allows, inclusively, single-hop, two-hop, . . . , and K-Hop paths, inclusively, from a source node to a destination node.

Full mesh—A network topology where each node is directly connected to every other remaining node in the network at full bandwidth.

Sparse mesh—A network topology where at least one node is not directly connected to every other remaining node in the network at full bandwidth.

Switching fabrics provide network connectivity between various network nodes and allow information to be communicated across the fabric between such nodes. Switching fabric architectures may be realized using various topologies, such as a mesh fabric, and may be applied in various situations within a network infrastructure. The switch fabric architectures may vary in complexity from, for example, small-scale switching fabrics implemented in a single network node, to large-scale networking fabrics comprising a large number of network nodes. For example, these switching fabrics may be implemented as an inter-chassis fabric used to interconnect a large number of chassis within a network cluster or as an intra-system backplane to connect ports or line cards within a single chassis.

Figure 1:
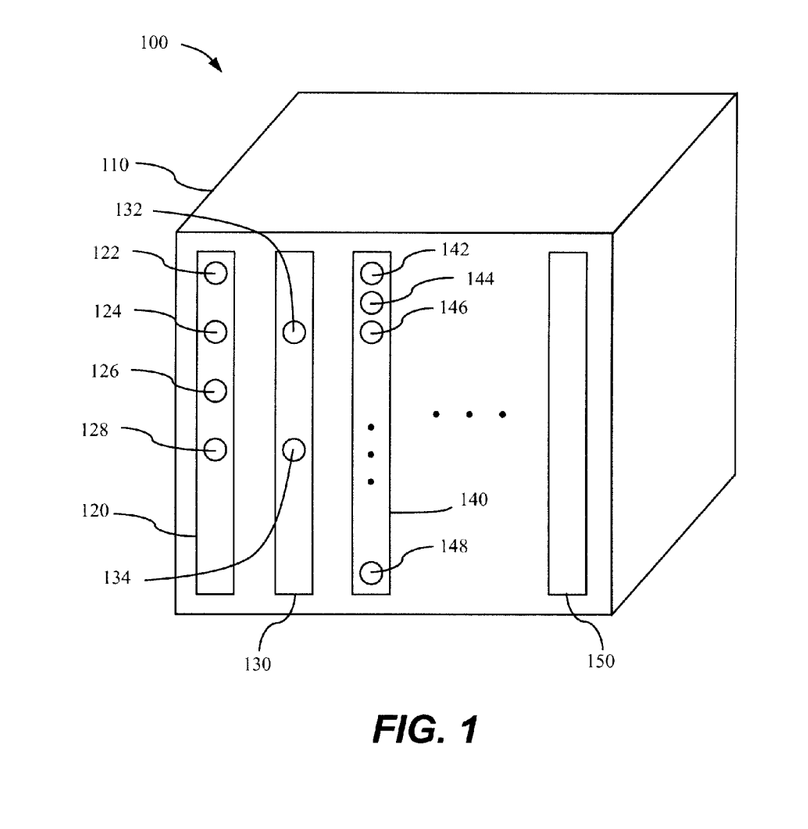
FIG. 1 illustrates an exemplary network node having a chassis and a plurality of pluggable line cards.

A switching fabric may be used to logically connect line cards or modules within a networking box. FIG. 1 illustrates an example of such an implementation in which the cards 120, 130, 140, 150 are positioned within a chassis 110 of a networking box 100. Typically, each line card contains one or more ports on which network traffic is received and/or transmitted. As shown in FIG. 1, line card 120 has four ports 122, 124, 126, 128, another line card 130 has two ports 132, 134, and yet another line card has sixteen ports (four of which are shown 142, 144, 146, 148). As should be readily understood, some cards, such as card 150, may be utilized to perform system functions and, therefore, will not include a network port.

The networking box or system 100 of FIG. 1 includes an interconnect fabric (not shown) which provides the communication paths between the various ports of the installed line cards. Some communication paths may be provided on a single line card, between a first port and a second port of the line card for example, while other communication paths may be provided across multiple cards, from a first port on a first card to a first port on a second card, through the use of a backplane interface for example. As should be readily understood, such communication paths can be provided between numerous networking systems, such as system 100, as part of a network infrastructure. These interconnect fabrics may include, but are not limited to, simple busses, point-to-point links, circuit switches, cell or packet switches, or other similar structures. Such interconnect fabrics may support various types of traffic flows such as unicast traffic, bicast traffic, multicast traffic, and broadcast traffic.

Traditionally, networking systems are designed with a specific maximum system throughput or bandwidth goal and once constructed cannot be easily scaled to efficiently support changing network infrastructures. For example, network infrastructures consisting of a larger number of nodes than originally planned or the need for larger bandwidths throughout the network infrastructure. This scalability limitation applies universally but for certain designs, such as a single-hop architecture for example, is more severe than for others. For purposes herein, a network "node" may refer to a port, or group of ports, on a line card, a line card within a network system, or a network system within a large cluster. Further, each network node can source traffic destined to any one or more nodes throughout the network infrastructure.

Figure 2:
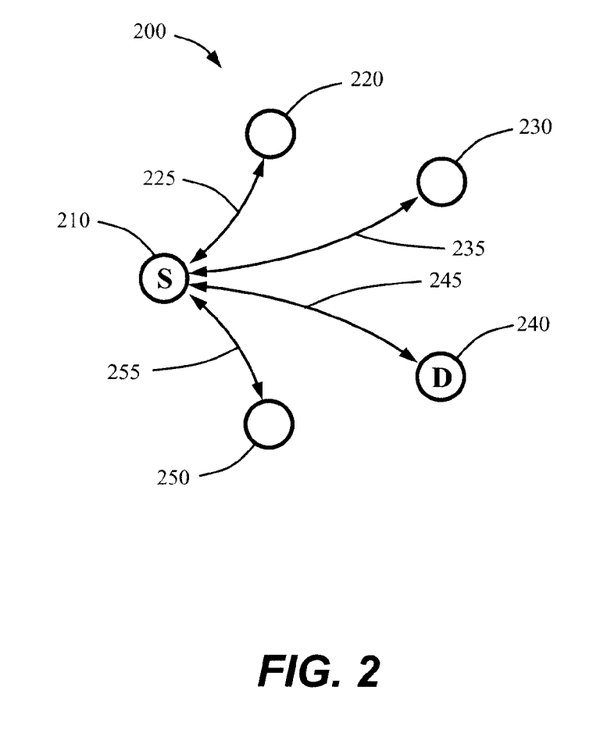
FIG. 2 is a general diagram showing point-to-point connectivity within a single-hop mesh fabric having five nodes.

FIG. 2 illustrates an exemplary mesh fabric 200 having five nodes. A source node 210 has a point-to-point connection with each of the other four nodes 220, 230, 240, 250 within the mesh via a respective connection 225, 235, 245, 255. While such mesh fabrics will typically have additional connections providing point-to-point connectivity between each node and each remaining node of the fabric 200, such additional connections are not illustrated for clarity purposes. The exemplary mesh fabric or single-hop fabric 200 of FIG. 2 requires traffic to traverse a signal link or hop from the source node 210, labeled S, to any of the remaining nodes, for example the destination node 240, indicated by the label D. Since each single link between the source node 210 and the remaining nodes 220, 230, 240, 250 defines a point-to-point link within the fabric 200, each link must be able to carry the entire bandwidth of any given node. That is, the link 245 must have the capacity to carry signals utilizing the entire bandwidth of the source node 210, the signals received by the destination node 240.

One skilled in the art will recognize the system scaling difficulties presented by the single-hop mesh fabric of exemplary mesh fabric 200. In particular, each newly added node to the fabric requires a direct connection to each of the deployed nodes within the mesh. If a switching fabric is sufficiently large, then a large number of connections are required for each newly added node. Accordingly, single-hop mesh switching fabrics are limited in their ability to scale because of the topological requirement that each node be directly connected to each of the remaining nodes in the fabric. For example, given a mesh fabric having N nodes, each of the N nodes having a bandwidth capacity of bandwidth B, each node must provide (N−1) links of capacity B in each direction. Further, given a complete system of N such nodes, it can be shown that the total fabric bandwidth, $B_T$, equals $N \times (N-1) \times B$. As the equation implies, the cost of the system will increase in square of the number of nodes in the network infrastructure.

Single-hop mesh fabrics also fail to provide sufficient redundancy across the paths within the fabric. If a path within the mesh fabric should fail, then information cannot be transported between the two nodes that are connected by the failed path. This lack of redundancy across single-hop mesh fabrics presents issues to design engineers when designing a system employing one or more mesh fabrics.

SUMMARY OF THE INVENTION

The present invention provides a multi-hop mesh fabric that allows networking systems to be more effectively scaled in light of demands for increased bandwidth and network infrastructure complexity, as seen through the increased number of network nodes within the fabric or higher desirable transport bandwidth for example. The multi-hop mesh fabric provides redundancy for each of the connections between the various nodes as part of the network infrastructure. The efficiency of the multi-hop mesh fabric may be further improved by employing various load distribution techniques, different scheduling methods, and other traffic management technologies known by one of skill in the art. The multi-hop mesh fabric is scalable such that the mesh fabric may be realized at different hardware environment levels. For example the communication links can be provided within a line card between devices, between two lines cards of a chassis, between two chassis within a cluster, and at other hardware levels as the network infrastructure is scaled up or down.

In various embodiments of the invention, a multi-hop mesh fabric is described that interconnects a plurality of nodes. This multi-hop mesh fabric provides multiple paths between a source node and a destination node. In certain scenarios, a source node and destination node are connected through the use of a single-hop path and at least one multi-hop path interconnection, for example a two-hop path interconnection. Using this plurality of paths, traffic between the two nodes may be distributed in order to transport the data more efficiently. Additionally, the multiple paths provide redundancy within the mesh and allow traffic to be diverted around a failure.

Certain embodiments of the invention are implemented at various levels of scale of the overall network infrastructure. For example, a number of network chassis may be interconnected using multi-hop mesh fabrics to create a networking cluster. In certain embodiments of the invention, a two-stage multi-hop mesh fabric is used to provide connectivity between two or more such chassis. Such a two-stage multi-hop mesh fabric provides advantages including better scalability and bandwidth cost improvements at a chassis/shelf level, and at the cluster level.

Other objects, features and advantages of the invention will be apparent from the drawings, and from the detailed description that follows below.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

The present invention provides a multi-hop mesh interconnect fabric that allows for more effective scaling of system size, bandwidth, and the number of communicating elements or nodes. The multi-hop mesh fabric also provides redundancy for each of the connections between nodes. The multi-hop mesh fabric may be realized in various different architectures including the maximum number of hops within the fabric and the layout of the fabric. The multi-hop mesh fabric may further improve its efficiency by employing various load distribution techniques, different scheduling methods, and other traffic management technologies known by one of skill in the art. Furthermore, the multi-hop mesh fabric may be realized in different environments including intra-devices, inter-device intra-blade, inter-blade intra-system, and inter-system intra-cluster.

The following description is set forth for the purpose of explanation in order to provide an understanding of the invention. However, it is apparent that one skilled in the art will recognize that embodiments of the present invention, some of which are described below, may be incorporated into a number of different computing systems and devices. The embodiments of the present invention may be included in hardware, software or firmware. Structures shown below in the diagram are illustrative of exemplary embodiments of the invention and are meant to avoid obscuring the invention. Furthermore, connections between components within the figures are not intended to be limited to direct electrical connections. Rather, data between these components may be modified, re-formatted or otherwise changed by intermediary components.

Reference in the specification to "one embodiment", "in one embodiment" or "an embodiment" etc. means that a particular feature, structure, characteristic, or function described in connection with the embodiment is included in at least one embodiment of the invention. The appearances of the phrase "in one embodiment" in various places in the specification are not necessarily all referring to the same embodiment.

A. Two-Hop Mesh Interconnect Fabric

Figure 3:
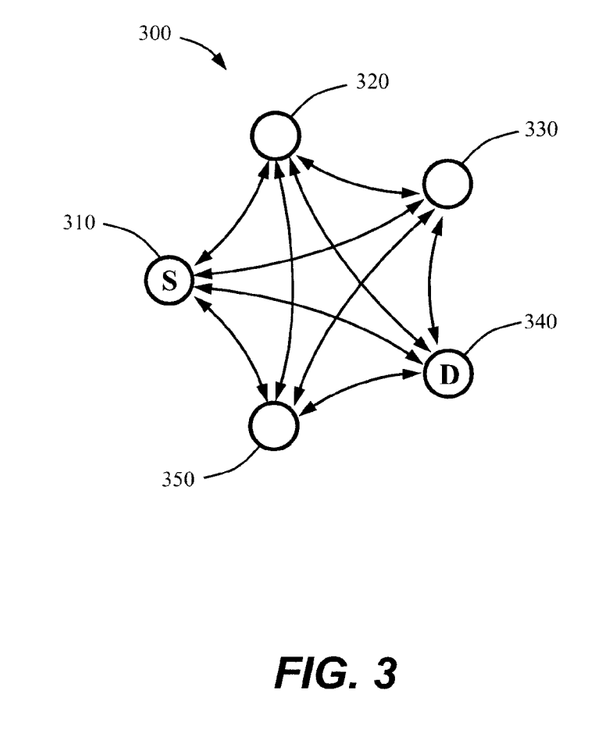
FIG. 3 is a general diagram showing connectivity within a two-hop mesh fabric having five nodes according to various embodiments of the present invention.

FIG. 3 shows an example of a two-hop mesh interconnect fabric 300 comprising five nodes according to various embodiments of the invention. In the embodiment of FIG. 3, each node is directly connected to every other node via communication links, as generally depicted by the arcs. Data traffic originating at a source node takes a path though the fabric which may contain a single link, which forms a direct, 1-hop path, or two consecutive links, which forms a 2-hop path. Thus, the two-hop mesh interconnect fabric provides both 1-hop and 2-hop paths between any source node and destination node. As an example, with respect to FIG. 3, a source node 310 has one direct path to a destination node 340, and three 2-hop paths to the destination node 340 through intermediate nodes 320, 330 and 350. Unlike the fabric 200 of FIG. 2 which requires each path 225, 235, 245, 255 to support the total bandwidth of the node, the traffic is split at the source node 310 over four paths, the bandwidth required of each link decreasing by a factor of 4. Typically, a two-hop mesh interconnect fabric provides a source node and a destination node with a single direct path, and N–2 two-hop paths, where N is the total number of nodes. Since each node of system 300 is connected to every other node through one 1-hop path and several 2-hop paths, greater freedom is provided in distribution of the traffic allowing for better utilization of the available link bandwidth. In contrast to a single-hop full mesh fabric where each link must support the total bandwidth of the node, load distribution, as discussed below with respect to the FIG. 3 embodiment, allows for a dramatic reduction in required link bandwidth.

The increased number of paths between a source node and destination node within the two-hop mesh interconnect fabric allows for node bandwidth to be more efficiently distributed across these multiple paths. For example, traffic arriving on a first line card may be transmitted over multiple paths through a fabric to a second line card. In addition, these multiple paths create interconnect redundancy which assures sustainable connection between any source and destination node even if one or more of the paths has been damaged or has become congested.

The two-hop connections have a longer latency than the single-hop connections of the two-hop mesh fabric because of the intermediary node located within the path. Upon receiving traffic, an intermediary node processes the traffic and identifies a destination node so that the second hop within the two-hop connection is identified prior to traffic being transmitted thereon.

Load balancing is performed across the multiple connections (both single and multi-hop paths of the two-hop mesh fabric) to improve the transmission of data between a source node and a destination node. In comparison to traditional centralized fabrics, the load on the multi-hop mesh fabric depends on the distribution of destination nodes. Each source node contains a scheduler that determines a particular path, either a single-hop or multi-hop path, for certain traffic within the data being sent from the source node to the destination node.

The scheduler also times when transmission on a particular path is performed. In various embodiments of the invention, latency on each path of a multi-path connection is known or approximated by the scheduler. Based on this latency, traffic on each of the paths is timed so that the traffic on the various paths arrives at approximately the correct sequence. As a result, the complexity of the sequencing process at the destination node is reduced and the size of the buffer that stores this traffic for resequencing purposes may be reduced. One skilled in the art will recognize that various load balancing techniques may be used to optimize the communication of traffic on a multi-path connection; all of these methods are intended to fall within the scope of the present invention.

A destination node contains a rescheduler that reassembles the traffic into the correct sequence so that the data may be further processed or transmitted. This rescheduler contains or interfaces with a buffer that stores the traffic so that reassembly of the traffic may occur. As previously mentioned, certain embodiments of the invention provide for this multi-path traffic to be scheduled so that its transmission is timed so that it arrives in sequence. Various resequencing techniques are known within the art, all of which are intended to fall within the scope of the invention.

Figure 4:
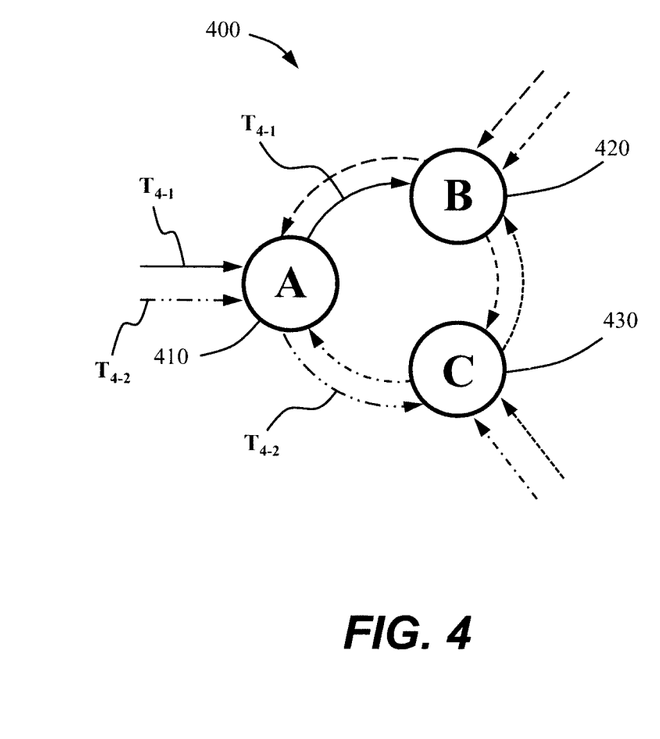
FIG. 4 is a general diagram of a 3 node 2-hop mesh fabric and illustrates the best case traffic distribution scenario.
Figure 5:
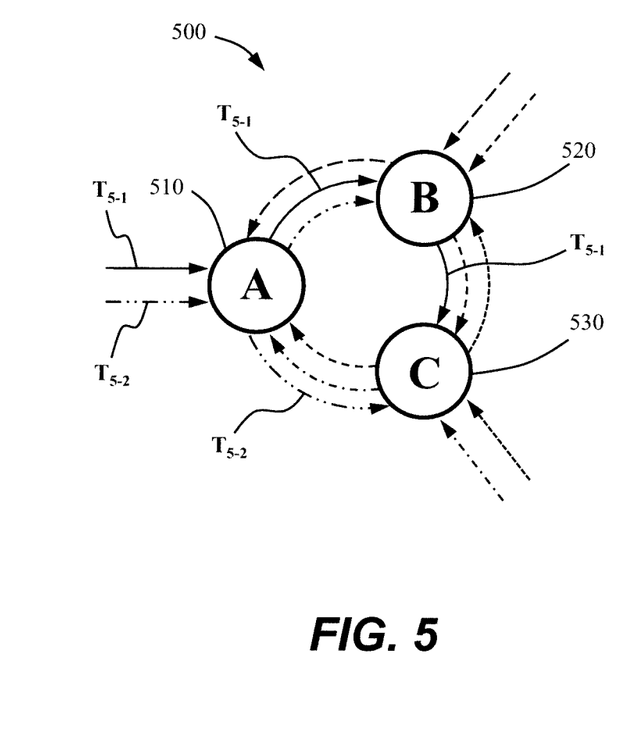
FIG. 5 is a general diagram of a 3 node 2-hop mesh fabric and illustrates the worst case traffic distribution scenario.
Figure 6:
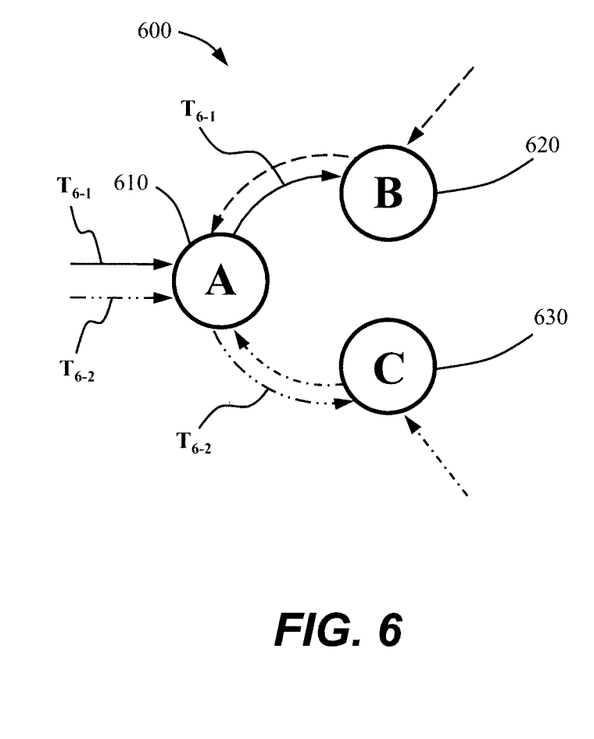
FIG. 6 is a general diagram of a 3 node 2-hop mesh fabric and illustrates an underutilized traffic distribution scenario typical of transport networks.

The following three exemplary traffic distributions of FIGS. 4-6 illustrate the bandwidth advantages of the multi-hop mesh interconnect fabrics disclosed and discussed herein. As a starting point for discussion, as stated above with respect to the single-hop full mesh interconnect fabric of FIG. 2, but now also considering the speed-up factor, the fabric link bandwidth is equal to the total bandwidth (B) of each node and the total fabric bandwidth ($B_{T2}$) is given by:

$$B_{T2} = N(N-1) \times \xi \times B$$

where:
B is the total bandwidth capacity of each node;
N is the total number of nodes; and
$\xi$ is the total speed-up factor.

FIG. 4 illustrates a first exemplary traffic distribution within a two-hop mesh fabric 400 in which three nodes 410, 420, 430 are connected within the mesh according to various embodiments of the invention. As depicted, the arrows of FIG. 4 indicate the traffic received by each node 410, 420, 430. All the packets travel exactly one-hop to a corresponding destination node. For example, traffic received by node A (410), represented by the two open-ended arrows $T_{4-1}$ and $T_{4-2}$, is forwarded to node B (420) and node C (430), respectively, in equal shares. In similar fashion, the traffic received by nodes B and C are directed to destination nodes over a single-hop path. This particular scenario, since the traffic is evenly distributed throughout the mesh fabric 400, results in uniform traffic between the nodes, which leads to the most efficient mode of operation.

In a typical application, it is desirable to avoid high link utilizations because of increased delays due to congestion and queuing or due to inefficiencies and imperfections of scheduling algorithms and procedures. Such "design underutilization" is often referred to as "speed-up factor" and is often in the range of 1.5-2 times the target bandwidth.

A comparison of the link bandwidth, $B_{L4}$, and the total fabric bandwidth, $B_{T4}$, illustrates the advantages of the two-hop mesh fabric configuration of FIG. 4 over a single-hop mesh fabric. The link bandwidth of each link within the two-hop interconnect fabric depicted in FIG. 4 is given as:

$$B_{L4} = \frac{\xi \times B}{N-1}$$

where:
B is the total bandwidth capacity of each node;
N is the total number of nodes; and
$\xi$ is the total speed-up factor.

The total fabric bandwidth with respect to the specific situation depicted in FIG. 4 is given as:

$$B_{T4} = N \times \xi \times B$$

where:
B is the total bandwidth capacity of each node;
N is the total number of nodes; and
$\xi$ is the total speed-up factor.

FIG. 5 illustrates a second exemplary traffic distribution within a two-hop mesh interconnect fabric 500 in which three nodes are connected within the mesh according to various embodiments of the invention. The three nodes 510, 520, 530 are connected to each other through a combination of single-hop connections and two-hop connections, as discussed above with respect to the FIG. 4 interconnect fabric 400. The arrows in FIG. 5, however, depict a different data or traffic flow throughout the system or fabric 500 as compared to fabric 400. In the second exemplary traffic distribution scenario of FIG. 5, it is presumed that the all traffic received by node 510 is intended for node 530, all traffic received by node 520 is intended for node 510 and all traffic received by node 530 is intended for node 520. As stated with respect to FIG. 4 above, the data received by each node 510, 520, 530 is represented by the open-ended arrows. Considering node 510, node 510 receives traffic depicted by a first arrow $T_{5-1}$ and a second arrow $T_{5-2}$, and the traffic is directed to destination node 530. As depicted, traffic $T_{5-1}$ takes a two-hop path to destination node 530 via node 520, while traffic $T_{5-2}$ takes a single-hop to node 530. In this example, the traffic received by nodes 520 and 530 is directed to destination nodes 510 and 530, respectively, in a manner as described above with respect to traffic received by node 510. The traffic distribution depicted in FIG. 5 is the worst case scenario, having a link bandwidth of each link within the two-hop fabric equal to:

$$B_{L5} = (2-\varepsilon) \times \frac{B \times \xi}{N-1}$$

where:
B is the total bandwidth capacity of each node;
N is the total number of nodes;
$\xi$ is the total speed-up factor; and
$\varepsilon$ is $1/(N-1)$.
while the total fabric bandwidth can be shown to be:

$$B_{T5} = N(2-\varepsilon) \times B \times \xi$$

where:
B is the total bandwidth capacity of each node;
N is the total number of nodes;
$\xi$ is the total speed-up factor; and
$\varepsilon$ is $1/(N-1)$.

As seen with respect to fabric 400 and fabric 500, the mesh interconnect fabric architecture of the present invention allows any mixture of uniform and non-uniform traffic flows as long as their total bandwidth is equal to the total fabric bandwidth for each slot. In this worst case scenario, as depicted in the exemplary traffic distribution of FIG. 5, the destinations are most non-uniformly distributed within the mesh fabric requiring an additional bandwidth given by the $(2-\varepsilon)$ factor to compensate for 2 hops that nearly all the packets take through the fabric. The multi-hop fabric allows for a range of trade-offs between "design underutilization" speed up factor $\xi$ and the topological factor $(2-\varepsilon)$ because in the typical applications extremely non-uniform traffic distributions are either impossible (such is in case of symmetrical bidirectional routing) or very unlikely.

FIG. 6 illustrates a third exemplary traffic distribution within a two-hop mesh interconnect fabric 600 in which three nodes are connected within the mesh according to various embodiments of the invention. As illustrated, three nodes 610, 620, 630 are interconnected in a mesh in which not all of the nodes are in communication with each other. In this particular example, there is no traffic flow from node 620 to node 630. Rather, all the traffic from node B (620) is directed to node A (610), and all traffic from node C is directed to node A (610). Such a network configuration can be better understood when considering nodes 620 and 630 being terminal nodes, interfacing to client equipment for example, acting as a conduit for the client data or traffic being sent to, or received from, the network infrastructure. In this case, the link bandwidth of the sparse mesh interconnect fabric of FIG. 6 can be shown to be:

$$B_{L6} = \frac{B \times \xi}{N-1}$$

where:
B is the total bandwidth capacity of each node;
N is the total number of nodes; and
$\xi$ is the total speed-up factor.
and the total fabric bandwidth can be shown to be:

$$B_{T6} = N \times B \times \xi$$

where:
B is the total bandwidth capacity of each node;
N is the total number of nodes;
$\xi$ is the total speed-up factor.

As will become apparent from the discussion below, one skilled in the art will recognize that the principles of the above-described traffic distributions related to the two-hop mesh interconnect fabric may be applied to any multi-hop fabric.

Figure 7:
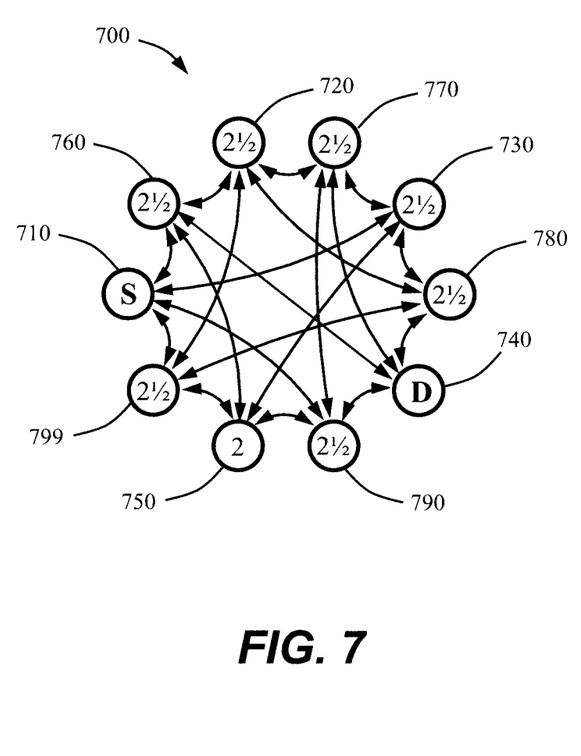
FIG. 7 generally illustrates a 10-node 3-hop sparse mesh fabric according to various embodiments of the present invention.

FIG. 7 illustrates an exemplary three-hop mesh interconnect fabric 700, according to various aspects of the invention, in which ten nodes are interconnected by the mesh. The interconnect fabric of FIG. 7 is a sparse mesh since the ten nodes are not all directly connected to the remaining nodes, for example there is no direct link between node 710 and node 720. Rather, the nodes are connected by multiple paths, each of which may be a two-hop or a three-hop path. For example, considering traffic traveling from a source node 710, labeled "S", to a destination node 740, labeled "D", the traffic is first divided into 4 equal parts and then each part is sent to the destination node 740 via a combination of two-hop and three-hop paths. A first and second portion of the traffic traverses two-hop paths while a third and fourth portion of the traffic traverses three-hop paths. More specifically, the first portion of the traffic travels from the source node 710 to intermediate node 760, and then on to the destination node 740, while the second portion of the traffic travels from the source node 710 to intermediate node 790 and then on to the destination node 740. The third portion of the traffic travels from the source node 710 to a first intermediate node 730, then to a second intermediate node 780, and then on to the destination node 740. Similar to the third portion, the fourth portion of the traffic takes a three-hop path traveling from the source node 710 to a first intermediate node 799, then to a second intermediate node 780, and then on to the destination node 740. The numerical identifiers of each of the nodes, e.g. "2" or "2½", indicate the average hops necessary to go from the source node 710 to that node. Since there are 2 two-hop paths and 2 three-hop paths between source node 710 and destination node 740 in the example above, it takes an average of 2½ hops ((2*2+2*3)/4). As noted, traffic traveling from source node 710 to a destination node 750 only requires an average of 2 hops per each of the four paths.

The three-hop mesh fabric effectively illustrates the ability of multi-hop fabrics to scale more easily than traditional single-hop mesh fabrics. For example, converting a two-hop mesh fabric, such as illustrated in FIG. 3, into the three-hop mesh fabric of FIG. 7 allows for the doubling in the number of nodes within a fabric without a corresponding increase in the number of links or their bandwidths within the mesh. For example, each node of fabric 700, as with each node of fabric 300 of FIG. 3, interfaces to the fabric 700 with four links. The use of multi-hop paths, including both two and three-hop paths, allows for the number of nodes to be almost doubled without having to add an ever-increasing number of links from each node.

Traffic between the nodes is transported across single-hop, two-hop and three-hop paths. In a worst case scenario, traffic from a source node is distributed through the network with nearly half of the traffic being transmitted on two-hop paths, half being transmitted on three-hop paths, and a small portion being transmitted on single-hop paths.

The three-hop mesh fabric of FIG. 7 requires a 25% increase of bandwidth in each link, as compared to the two-hop mesh fabric, in order to compensate for the additional half-hop traversal experienced by the traffic, on average. The link bandwidth of each link within the three-hop mesh interconnect fabric, as depicted in FIG. 7, is equal to:

$$B_{L7} = \left(2\frac{1}{2} - \varepsilon\right) \times \frac{2 \times B \times \xi}{N-1}$$

where:
B is the total bandwidth capacity of each node;
N is the total number of nodes;
ξ is a speed-up factor; and
ε is 1/(N−1).
and the total fabric bandwidth can be shown to be:

$$B7 = N(2\frac{1}{2} - \varepsilon)(B \times \xi)$$

where:
B is the total bandwidth capacity of each node;
N is the total number of nodes;
ξ is the total speed-up factor; and
ε is 1/(N−1).

The multi-hop mesh fabric method, in accordance with the present invention, may be applied to various types of fabric topologies including the full and partial (sparse) mesh topologies described above multi-dimensional topologies including torus, hypercube, and other such fabrics common in large-scale multi-processor clusters, fat-tree fabric topologies typical of centralized multi-stage packet switches that may be used to aggregate smaller switches into larger fabrics. The multi-hop mesh fabrics may also be applied to Banyan, butterfly, and Turner network multi-stage switches deployed as centralized fabrics as well as cross-point, cross-bar, and Clos networks used in traditional circuit switching applications.

The multi-hop mesh fabrics may be applied to many areas of networking and distributed applications. As previously discussed, these applications include cell switches and packet switches/routers providing various functionality and located in different positions including, but not limited to, intra-device fabrics (chips), inter-device intra-blade/board fabrics, inter-blade intra-system fabrics, and inter-system intra-cluster fabrics.

Figure 8:
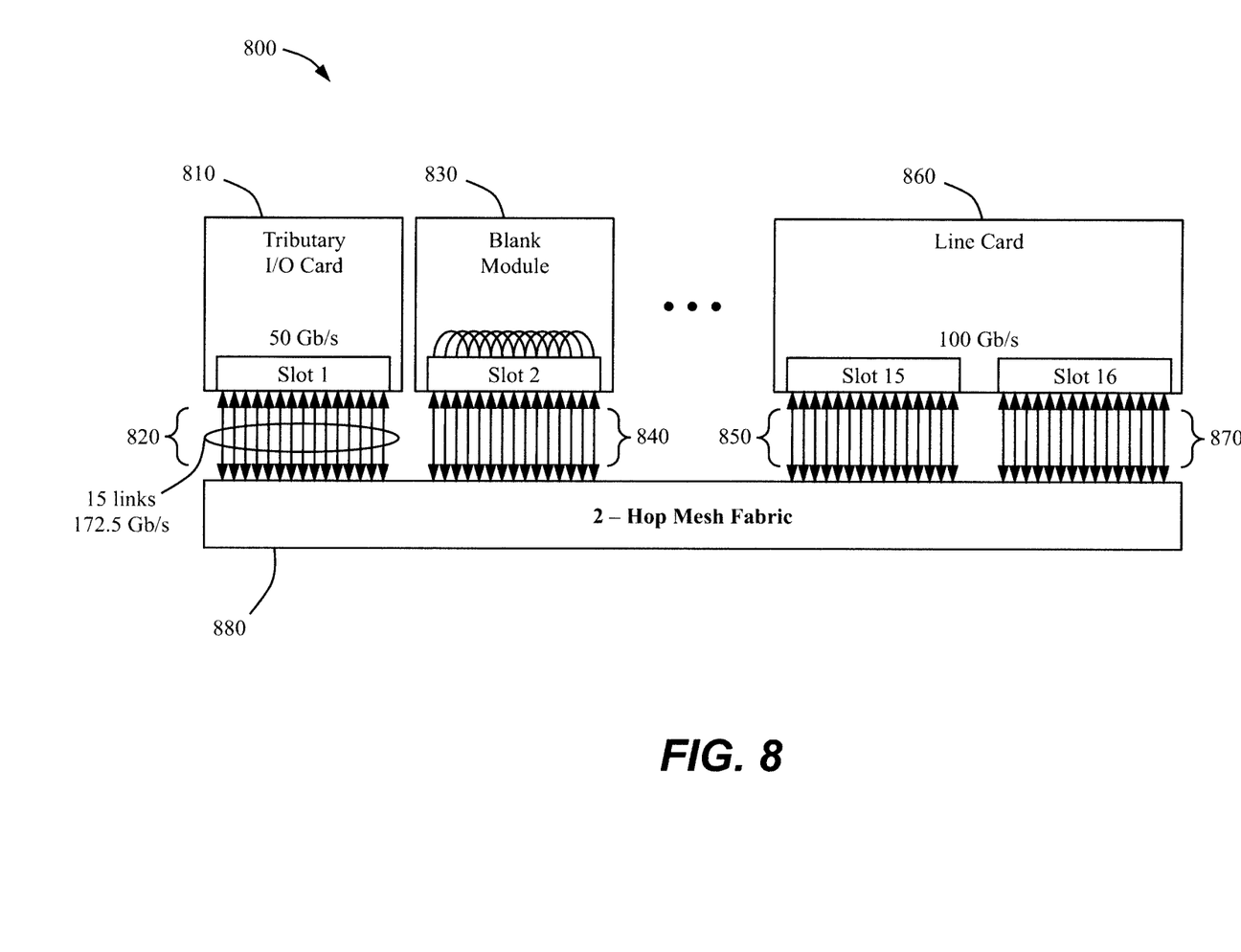
FIG. 8 illustrates an exemplary 16-slot shelf assembly having a two-hop mesh fabric according to various embodiments of the present invention.

FIGS. 8-11 illustrate various implementations of the multi-hop mesh fabric according to certain embodiments of the present invention. FIG. 8 shows a single shelf 800G network node with a two-hop mesh fabric 880 interconnecting 16 50 Gb/s slots, according to various embodiments of the invention. A chassis 800 includes slots for various types of pluggable modules such as tributary cards, and line cards capable of receiving and transmitting data at various rates, in accordance with various protocols. The 800G shelf is designed to have 50 Gb/s slot I/O interfaces and to be highly redundant due to the speed-up factor of 3.45 in this implementation and, thus, able to withstand a loss of nearly half of the bandwidth of the multi-hop mesh fabric. Such a loss is idiosyncratic for this type of fabric since the disconnection or removal of one or more modules from the fabric causes a corresponding loss of interconnecting two-hop paths.

The chassis may receive a tributary I/O card 810, such as a 50 Gb/s card shown, that interfaces with a two-hop mesh fabric 880 using a plurality of parallel links 820. In this example, there are 15 links having a total bandwidth of 172.5 Gb/s. The tributary I/O card 810 can receive any type of client signal including, but not limited to, Ethernet, SONET, Frame Relay, Fibre Channel, Infiniband, and OTN signals.

Blank modules, such as blank module 830 as depicted, are inserted into unused slots within the chassis to provide a sufficient number of two-hop paths to support the required bandwidth. The exact number of blank modules required for proper operation depends on the speed-up factor and the number of slots already used by active modules as can be determined from the equations given in above, and if the three-hop topology is used. The blank modules interface with the two-hop mesh fabric 880 using a parallel link 840 structure.

Larger multiple slot modules are also supported in which case bandwidths of multiple fabric interfaces are aggregated into a larger common interface in support of higher bandwidth applications. For example, a double bandwidth line card 860 interfaces through two slots, each slot having parallel links (here 850 and 870) to the two-hop mesh fabric 880. One skilled in the art will recognize that numerous different combinations of cards and slot configurations may be used within the present scope of the invention.

Figure 9:
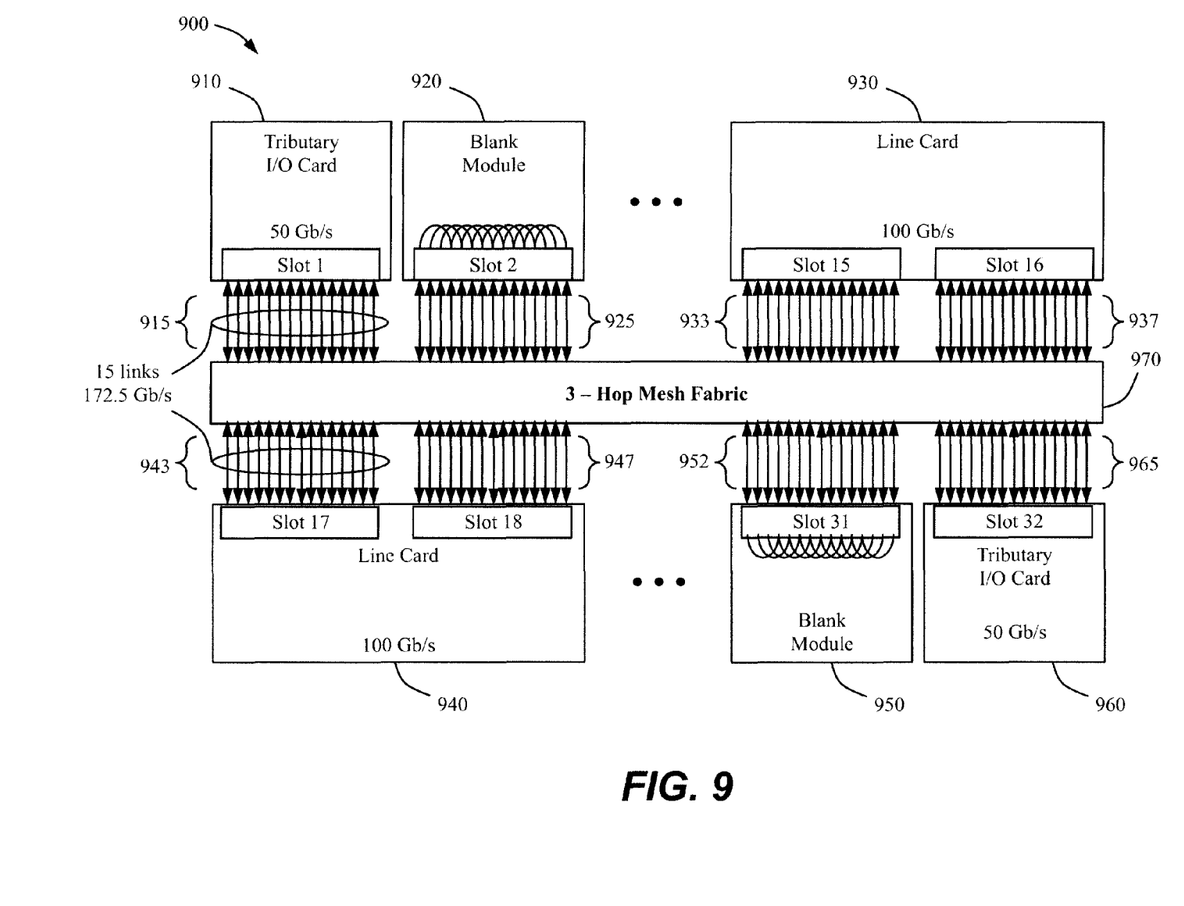
FIG. 9 illustrates an exemplary 32-slot dual-shelf assembly having a three-hop sparse mesh fabric according to various embodiments of the present invention.

FIG. 9 illustrates the scalability of the multi-hop fabrics of the present invention by showing how the previous embodiment of FIG. 8 can be doubled in capacity, bandwidth, and the number of slots, e.g. s 32-slot, 1600 Gb/s configuration. This scalability is accomplished by changing the multi-hop fabric strategy from a two-hop strategy to a three-hop strategy. Resulting chassis 900, containing a three-hop mesh fabric 970, uses the very same modules as the chassis 800 of FIG. 8, such as a tributary card 910, a line card 930, and a blank module or card 920.

The chassis 900 may receive one or more tributary I/O card 910, 960 that interface with the three-hop mesh fabric 970 via an interface link 915, 965. The tributary I/O card 910, 960 may receive and transmit client signals of various different formats/protocols and different rates, as with other tributary I/O cards described herein. In this particular example, the interface links 915, 965 are fifteen parallel links having a total bandwidth of 172.5 Gb/s.

Other cards may be inserted into slots and interfaced with the mesh fabric 970. For example, a line card 930 interfaces with the mesh fabric 970 using a first parallel link interface 933 and a second parallel link interface 937, while a line card 940 interfaces with the mesh fabric 970 using parallel link interfaces 943, 947. Additionally, blank modules, such as modules 920 and 950, occupy unused slots and are replaced by active cards, as needed, to add additional capacity to the chassis 900. These blank modules 920, 950 interface within the mesh fabric 970 using parallel links 925, 952, respectively.

Figure 10:
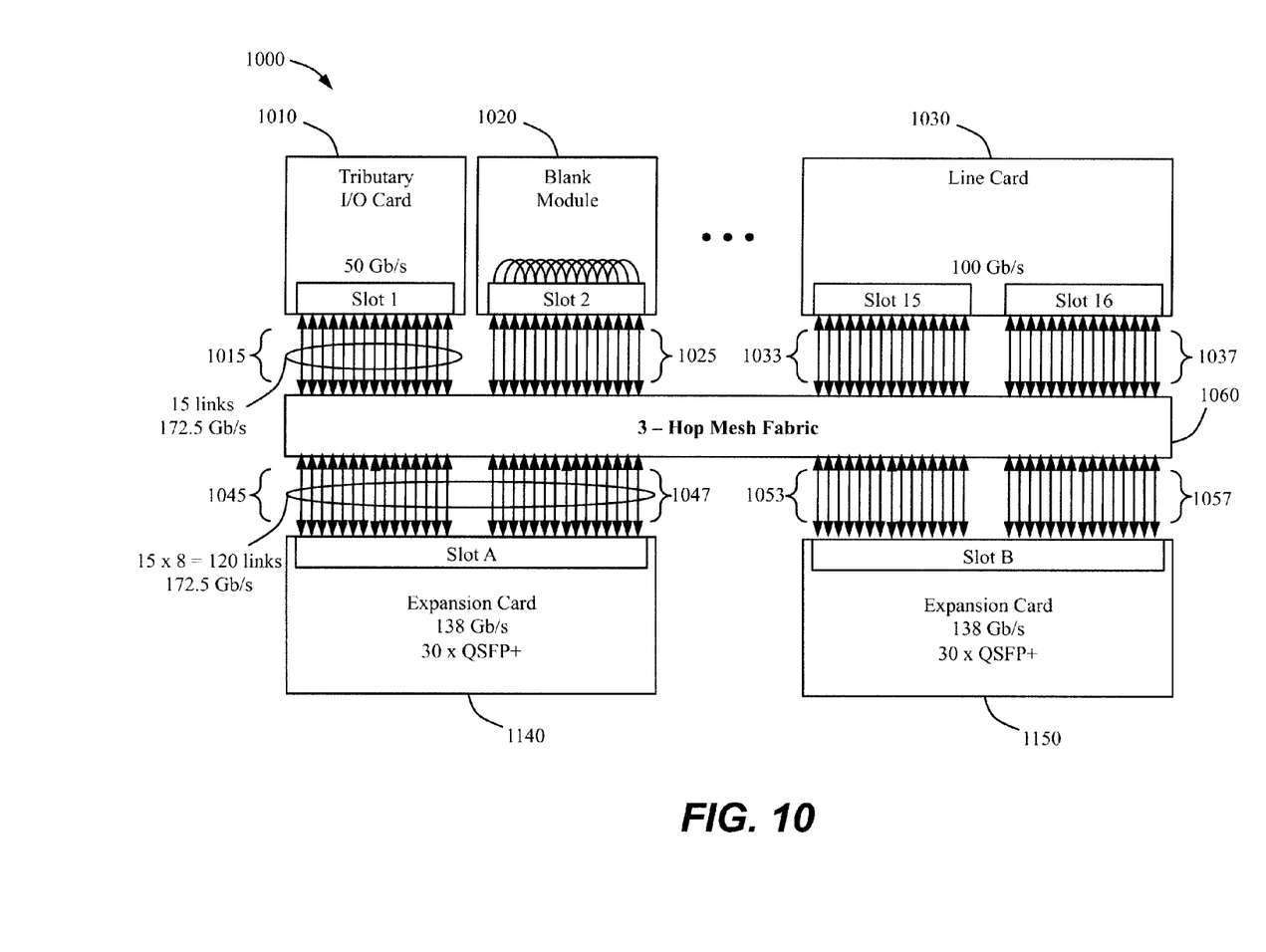
FIG. 10 illustrates the use of an expansion chassis with a three-hop mesh fabric according to various embodiments of the present invention.

FIG. 10 exemplifies an additional scalability facility, namely a chassis expansion. The expansion method allows interconnection of multiple chassis by inter-chassis links according to various embodiments of the invention. As depicted in FIG. 10, the chassis 1000 contains a three-hop mesh fabric 1060 interconnecting the 16 slots for line, blank, and tributary modules with specialized expansion slots carrying extension cards, such as extension cards 1040 and 1050.

The 16 slots of chassis 1000 may receive tributary I/O cards, such as card 1010 interfacing with the three-hop mesh fabric 1060 using parallel links 1015. The line cards, such as card 1030, may interface with the mesh fabric 1060 using one or more parallel links, such as interfaces 1033, 1037, while the blank modules, such as module 1020, interface with the mesh fabric 1060 via links, such as link 1025. The chassis 1000 can also receive extension cards which function as inter-chassis interconnects. For example, cards 1040, 1050 interface with the three-hop mesh fabric 1060 via a set of 120 parallel links 1045, 1047, 1053, 1057. Both extension cards 1040, 1050 have bandwidth of 1380 Gb/s and carry 30 QSPF+ modules.

According to various embodiments of the present invention, the extension cards 1040, 1050 provide the termination point for inter-chassis links. These links create a mesh structure that is similar to the mesh structures illustrated in FIG. 3 and subsequent illustrations, of which each node represent an entire chassis. As previously described, the mesh of chassis topology is also expandable due to the scalability principle of the multi-hop mesh fabric of the present invention.

The scalability of the multi-chassis cluster is greatly improved because of the multi-hop mesh fabrics used internally within each chassis as well as the multi-hop mesh fabrics used to interconnect the chassis. As a result, the number of slots within each of the chassis may be scaled more effectively when compared to prior art chassis and fabric architectures because of the inner-chassis multi-hop mesh fabrics. Additionally, the number of chassis within the cluster may be more effectively scaled because of the intra-chassis multi-hop mesh fabrics.

Figure 11:
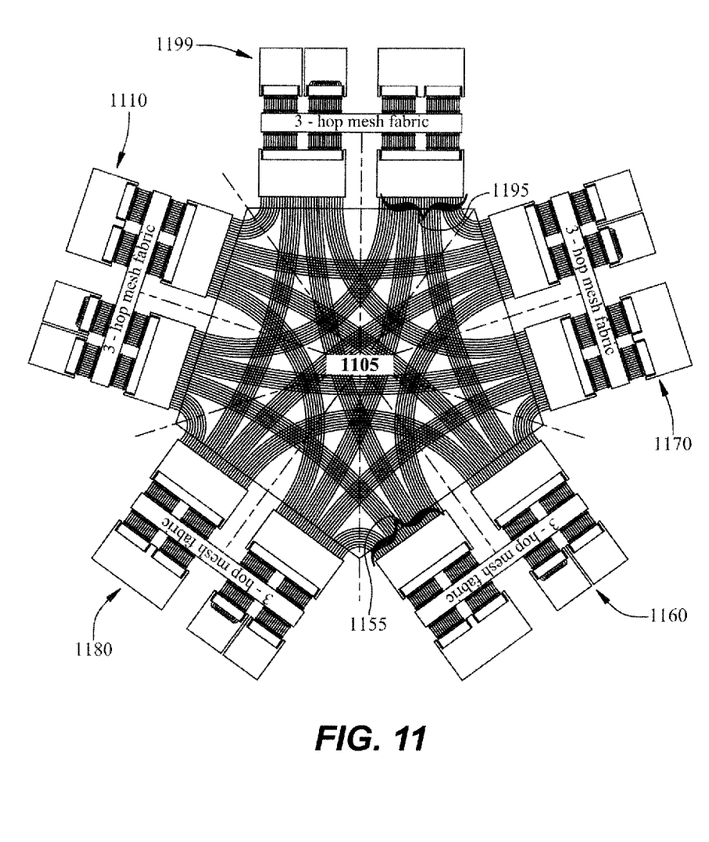
FIG. 11 is a diagram of an exemplary large, cluster-scale system of five chassis using a multi-hop mesh fabric according to various embodiments of the present invention.

FIG. 11 illustrates an exemplary multi-chassis cluster according to various embodiments of the invention. In this particular example, a five chassis, 4 Terabit cluster is created by interconnecting five chassis 1110, 1160, 1170, 1180, 1199 together using a plurality of extension cards having multi-hop mesh fabrics. These multi-hop mesh fabrics create a large-scale inter-chassis interconnect 1105 that provides cluster-level switching fabric.

In this implementation, a two-stage mesh fabric is shown within the cluster. A first stage of the fabric is within each of the five chassis and transports data from a tributary card to one or more line cards. In various embodiments, this first stage may be a three-hop fabric as previously shown in FIG. 10 and described. A second stage of the fabric interconnects each of the five chassis and transports data from shelf to shelf. In this particular example, this second stage is a two-hop, 5-slot fabric, e.g. each chassis interfaces with the large-scale switch fabric 1105 through one of the five slots. Thus, traffic from each of the four links 1195 of chassis 1199 takes a two-hop path to the corresponding four links 1155 of chassis 1160.

According to various embodiments of the invention, each shelf 1110, 1160, 1170, 1180, 1199 contains two expansion cards, each expansion card having a multi-hop mesh fabric. The multi-hop mesh fabrics provide various amounts of link bandwidth and total fabric bandwidth in accordance with the various embodiments of the invention. Each shelf may have various connections within the large-scale inter-chassis switch fabric 1105. Furthermore, the lines and tributaries for each shelf may vary depending upon the types of data that are transported and the rate of the traffic.

The two-stage multi-hop mesh fabric in this example allows for in-service expansion of the multi-chassis cluster by adding additional chassis and reconnecting the links within the fabric to include the new chassis. Additionally, the first-stage and second-stage multi-hop mesh fabric provide a high level of redundancy across the cluster.

The foregoing description of the invention has been described for purposes of clarity and understanding. It is not intended to limit the invention to the precise form disclosed. Various modifications may be possible within the scope and equivalence of the appended claims.

I claim:

1. A networking device comprising:
a chassis having a housing and plurality of slots;
a plurality of cards, inserted within the plurality of slots, that receive and transmit network traffic;
a backplane, within the chassis and communicatively coupled to the plurality of cards, that transports the network traffic between the plurality of cards;
a multi-hop mesh fabric provided in the chassis, the backplane including a portion of the multi-hop mesh fabric, that includes multiple paths between a first card within the plurality of cards and a second card within the plurality of cards, the multi-hop mesh fabric facilitating connections between the first and second cards and having a full mesh configuration;
a traffic scheduler, within the first card, that schedules a transmission of the traffic from the first card to the multiple paths, and
a load distribution module, that balances traffic on the multiple paths within the multi-hope mesh fabric between first card and the second card based on a distribution of nodes coupled to the multiple paths,
wherein the multiple paths comprises at least one single-hop path and at least one multi-hop path.

2. The networking device of claim 1 wherein the multi-hop mesh fabric is a two-hop mesh fabric.

3. The networking device of claim 1 wherein the multi-hop mesh fabric is a three-hop mesh fabric.

4. The networking device of claim 1 wherein the plurality of cards includes at least one tributary card and at least one line card.

5. The networking device of claim 1 wherein a line card of the at least one line card interfaces with at least two slots, within the plurality of slots, to transport traffic to the backplane.

6. The networking device of claim 1 wherein the traffic is routed around a first path, within the multiple paths, in response to a failure identified on the first path.

7. The networking device of claim 1 wherein the networking device is a first networking device, and the plurality of cards comprises an extension card that couples to a second networking device and at least partially creates an inter-chassis multi-hop mesh fabric.

8. The networking device of claim 7 wherein the extension card interfaces with at least two slots, within the plurality of slots, to facilitate the coupling between the first networking device and the second networking device.

9. A networking cluster comprising:
a first networking device, coupled to receive first network traffic on a first plurality of cards, having a chassis and a first multi-hop mesh fabric provided in the chassis that transports the first network traffic between the first plurality of cards, the first multi-hop mesh fabric having a full mesh configuration;
a second networking device, coupled to receive second network traffic on a second plurality of cards, having a second multi-hop mesh fabric that transports the second network traffic between the second plurality of cards;

a first extension card, coupled within the first networking device, having a third multi-hop mesh fabric that transports the first network traffic between the first networking device and the second networking device;

a second extension card, coupled within the second networking device, having a fourth multi-hop mesh fabric that transports the second network traffic between the first networking device and the second networking device;

a traffic scheduler that schedules a transmission of the first and second network traffic; and a load balancing module, within the first networking device, that balances transport of the first network traffic over paths within the first multi-hop mesh fabric based on a distribution of nodes coupled to the first multi-hop mesh fabric.

10. The network cluster of claim 9 wherein the first multi-hop mesh fabric, the second multi-hop mesh fabric, the third multi-hop mesh fabric or the fourth multi-hop mesh fabric has a sparse mesh configuration.

11. The network cluster of claim 9 wherein the first multi-hop mesh fabric, the second multi-hop mesh fabric, the third multi-hop mesh fabric or the fourth multi-hop mesh fabric is a two-hop mesh fabric.

12. The network cluster of claim 9 wherein the first multi-hop mesh fabric, the second multi-hop mesh fabric, the third multi-hop mesh fabric or the fourth multi-hop mesh fabric is a three-hop mesh fabric.

13. The network cluster of claim 9 further comprising a third extension card, coupled within the first networking device, having a fifth multi-hop mesh fabric that transports the first network traffic between the first networking device and the second networking device.

14. The network cluster of claim 13 further comprising a fifth extension card, coupled within the second networking device, having a sixth multi-hop mesh fabric that transports the second network traffic between the first networking device and the second networking device.

15. The network cluster of claim 9 wherein the first extension card uses two slots within the first networking device to interface with the first multi-hop mesh fabric.

16. The network cluster of claim 15 wherein the second extension card uses two slots within the second networking device to interface with the second multi-hop mesh fabric.

17. The network cluster of claim 9 further comprising at least one tributary card within the first networking device that receives first network traffic at a rate slower than the rate of the first multi-hop mesh fabric.

18. The network cluster of claim 9 wherein the load balancing module controls transport of the first network traffic through the third multi-hop mesh fabric within the first extension module.

19. The network cluster of claim 9, further including a switch, wherein the first and second multi-hop fabrics constitute a first stage of the switch and the third and fourth multi-hop fabrics constitute a second stage of the switch.

20. A method for transporting network traffic from a source node to a destination node within a mesh fabric provided in a chassis, the method comprising:

receiving traffic at a source node from a card within a networking device;

scheduling a transmission of a first portion of the traffic on a first path within the mesh fabric and a second portion of the traffic on a second path within the mesh fabric, the first and second paths constituting an intermediary node, and the mesh fabric having a full mesh configuration;

transmitting the first and second portions of the traffic on the first and second paths, respectively, within the mesh fabric;

receiving the first and second portions of the traffic on the destination node from the first and second paths;

reassembling the traffic from the first and second portions of the traffic received from the first and second paths;

transmitting the reassembled traffic from the destination node; and balancing traffic load on the first and second paths within the mesh fabric based on a distribution of nodes coupled to the mesh fabric.

21. The method of claim 20 wherein the first and second paths comprises a two-hop path between the source node and the destination node.

22. The method of claim 20 wherein the first and second paths comprises a three-hop path between the source node and the destination node.

23. The method of claim 20 wherein the mesh fabric is a sparse mesh fabric.

24. An apparatus comprising:

a chassis and a multi-hop mesh fabric provided in the chassis;

a first node that receives traffic outside of the mesh fabric and transmits a first portion of the traffic onto a single-hop path and a second portion of the traffic on a multi-hop path, the mesh fabric having a full mesh configuration;

an intermediary node, coupled within the multi-hop path, that transports the second portion of the traffic along the multi-hop path;

a second node, coupled to the single-hop path and the multi-hop path, that receives the first portion of the traffic from the first node and the second portion of the traffic from the intermediary node;

a scheduler circuit, coupled within the first node, that determines an allocation of the first portion of transmitted traffic on the single-hop path and the second portion of transmitted traffic on the multi-hop path; and a load distribution module, that balances the traffic over the single-hop path and the multi-hop path within the mesh fabric based on a distribution of nodes coupled to the mesh fabric.

25. The multi-hop mesh fabric of claim 24, wherein the intermediary node is a first intermediary node, the multi-hop mesh fabric further comprising a second intermediary node, coupled within the multi-hop path, that further transports the traffic along the multi-hop path.

26. The multi-hop mesh fabric of claim 24 further comprising a resequencer circuit, coupled within the second node, that reassembles the first and second portions of the traffic received from the single-hop path and the multi-hop path, respectively.

27. The multi-hop mesh fabric of claim 24 wherein the scheduler circuit approximates latency on the multi-hop path and uses the approximated latency in determining the allocation of the first portion of transmitted traffic on the single-hop path and the second portion of transmitted traffic on the multi-hop path.

* * * * *